Dec. 19, 1933.  J. G. WASSON  1,939,838
INSECT DESTROYER
Filed Feb. 18, 1933
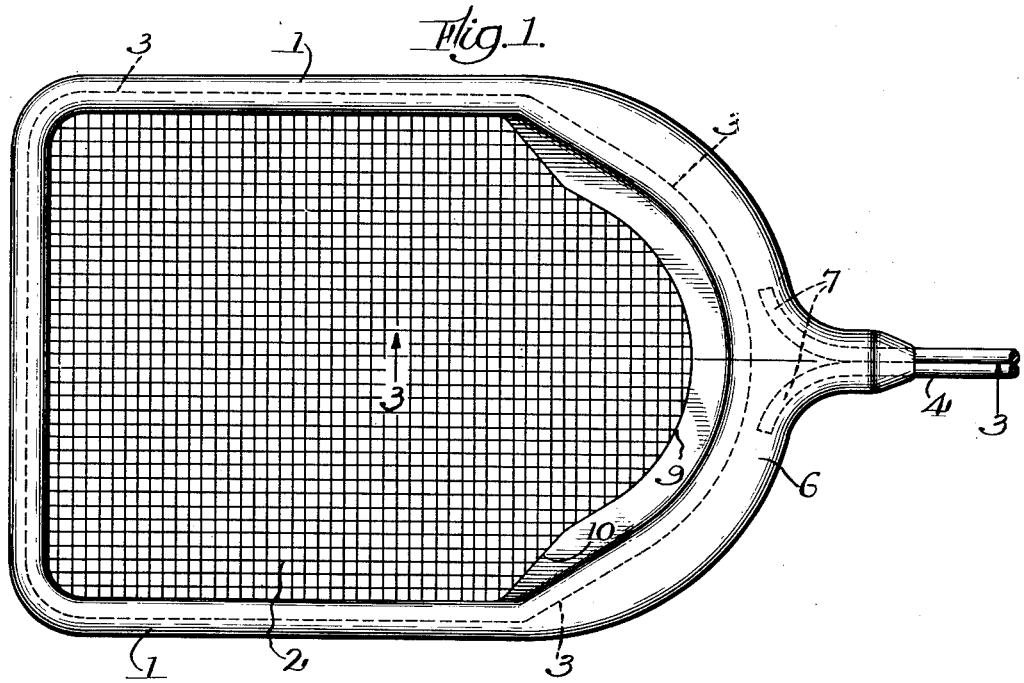
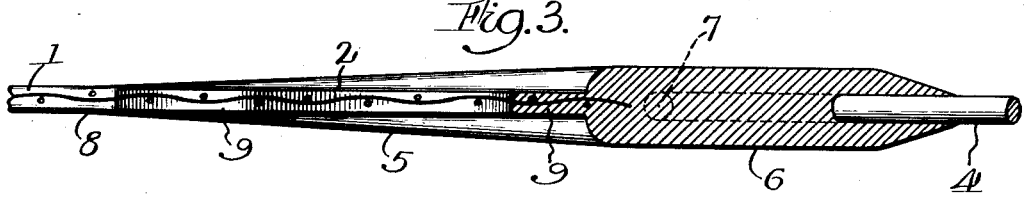

Patented Dec. 19, 1933

1,939,838

UNITED STATES PATENT OFFICE 1,939,838

INSECT DESTROYER

James G. Wasson, Canton, Ill.

Application February 18, 1933. Serial No. 657,324

3 Claims. (Cl. 43—137)

This invention has reference to an insect destroyer, such for instance, as a fly swatter of the type wherein the body portion thereof composed preferably of foraminous material, such as wire cloth or netting, is embedded within a frame portion made of vulcanizable material, such as rubber or like material, whereby when the device is used in striking and killing flies and other insects settling upon walls and furniture, the latter will be protected from becoming marred or scratched.

The invention has for its principal object to provide a fly swatter of the type above referred to wherein the frame thereof, in which is embedded the marginal portions of the wire cloth or netting, is gradually thickened at one end portion thereof to which is attached at the portion of greatest thickness the end of a stick or handle, such end being similarly embedded in the thickened frame portion as the body portion, such gradually thickened portion of the frame contiguous to the connection of the stick or handle acting to reinforce the frame at the point of constant bending and yielding caused when striking blows with the swatter, thereby insuring a longer and useful life to the swatter.

The invention has for a further object to provide an extension of said frame throughout the length thereof which is thickened whereby the body portion, such as wire cloth or netting, will be doubly embedded in said extension and frame, being the area of bending and yielding during use, whereby as the result of long and continued use thereof and the possible fracturing or breaking of such body portion within the extension at the point of bending and yielding, said extension of said frame will prevent the body portion from becoming loose and detached from the frame.

The invention has for a further object to provide an insect destroyer of the character referred to which may be readily and easily cleansed without impairment so as to render it at all times sanitary.

Other and further objects and improvements will more fully appear from the following description.

That the invention may be more fully understood, reference is had to the accompanying drawing forming a part of this description and illustrating a preferred embodiment of the invention, in which:

Fig. 1 is a plan view of my improved insect destroying device, the handle thereof being broken away;

Fig. 2 is a side view in elevation of Fig. 1, and

Fig. 3 is a sectional view in elevation, as the same would appear if taken on the line 3—3 Fig. 1.

Like characters of reference denote corresponding parts throughout the figures.

Reference being had to the drawing, 1 designates a frame preferably made of flexible vulcanizable material, such as rubber. The frame is illustrated in somewhat rectangular shape but may be of any other suitable shape or outline without departing from the scope of the invention. A foraminous body material 2 preferably wire cloth or netting is received within the frame 1 by preferably vulcanizing said frame upon the marginal portions of the body material, indicated in dotted lines in Fig. 1 at 3 and is suitably accomplished in a mold for the purpose, thereby affording a lasting and durable connection between the frame 1 and body material 2.

Contiguous to the point of attachment of a stick or handle 4 to the frame, I preferably gradually thicken the body of said frame as at 5, see Figures 2 and 3, equidistantly from the point of connection of said handle, so that such connection of the handle 4 to the frame 1 will be received therein in the thickest portion, as at 6 best seen in Fig. 3. The stick or handle 4, in the present instance, is represented by strands of wire, their ends 7, being indicated in dotted lines, see Figures 1 and 3, being curved divergently and similarly embedded and vulcanized within the frame 1 like the body material 2.

The thickened portion 6, see Fig. 2, gradually tapers as at 5 to the normal thickness of the frame 1, such merging of the tapering portion with the frame at 8, see Fig. 2, being substantially beyond that point or area in the frame wherein takes place the bending and yielding thereof by reason of striking blows when exterminating insects and the like. Such tapered and thickened portions 5 and 6 afford the embedded marginal portions 3 of the body material 2 protection where most needed, since it is in this area of the frame 1 that the body material and frame are caused to bend and yield when in use, thereby assuring a long and useful life to the device.

An extension member 9 is provided in the frame, preferably of the same material as the frame and integral therewith, such member having received and embedded therein the body material 2 like the frame, said member preferably extending inwardly throughout the area of the frame which is thickened, that is, the portions 5 and 6. The juncture of the member 9 to the frame 1 is preferably at the mergence of the tapering portion 5 with the frame at 8 and said member at said juncture is preferably tapered as at 10. The extension member 9 acts as a supplemental binder for the body material 2, the marginal portions of which in the area of said member are located within the thickened portions 5 and 6 of the frame. It will be understood that in the event that portion of the body material 2 which is embedded in the extension member 9 becomes broken and separated from the marginal portion embedded within the portions 5 and 6 by reason of continuous bending and yielding incident to a long and hard usage, that such broken and separated wires of the body portion will be prevented from projecting through the extension member and becoming exposed to prick the fingers and scratch objects, such as furniture when in use, thereby giving to the device a substantially unlimited life of usefulness even though that area of the body portion embedded within the extension member 9 and portions 5 and 6 of the frame has become impaired, as indicated.

In constructing the device, the frame 1 being of a vulcanizable material, such as rubber, will flow, during such vulcanization, through the perforations or openings of the body material 2 and about the ends of the handle or stick 4 and obtain a firm and rigid hold upon them, thereby making a subsequent separation practically impossible, thus making the device most durable and useful.

In order to cleanse the device, it may be washed in boiling water or any other suitable cleansing fluid without fear of weakening or impairing the same.

What I claim is:

1. A device of the character described comprising a foraminous member, a frame therefor consisting of a vulcanizable material, the marginal portions of said member being embedded in said frame, a handle for the frame, said frame at the joiner of the handle thereto and on opposite sides thereof being thicker than the remainder of the frame, said thickened frame portion being of substantial length and extending to the sides of the frame at diametrically opposite points at substantially the widest separation of said sides, and an extension member of vulcanizable material and integral with said frame provided in the area of said thickened frame portion for embedding additional area of said foraminous member.

2. A device of the character described comprising a foraminous member, a frame therefor consisting of a vulcanizable material, the marginal portion of said member being embedded in said frame, a handle for the frame, said frame having a curved portion adjoining the handle, and said frame at the joiner of the handle thereto and on opposite sides thereof being thicker than the remainder of the frame, and an extension member of vulcanizable material and integral with said frame provided in the area of said thickened frame portion for embedding additional area of said foraminous member, said extension member extending on opposite sides of and away from the handle approximately to points connecting the largest chord of the curved portion of the frame.

3. A device of the character described comprising a foraminous member, a frame therefor consisting of a vulcanizable material, the marginal portion of said member being embedded in said frame, a handle for the frame, said frame having a curved portion adjoining the handle, and said frame at the joiner of the handle thereto and on opposite sides thereof being thicker than the remainder of the frame, said thickened frame portion tapering at the mergence thereof with the remainder of the frame, and an extension member of vulcanizable material and integral with said frame provided in the area of said thickened frame portion for embedding additional area of said foraminous member, said extension member extending on opposite sides of and away from the handle approximately to points connecting the largest chord of the curved portion of the frame.

JAMES G. WASSON.